(12) United States Patent
Gueorguiev et al.

(10) Patent No.: US 8,299,441 B2
(45) Date of Patent: Oct. 30, 2012

(54) DIRECTIONAL GAMMA RADIATION DETECTOR SYSTEM

(75) Inventors: Andrey Gueorguiev, Oak Ridge, TN (US); Guntram Pausch, Dresden (DE); Claus-Michael Herbach, Dresden (DE); Les Hoy, Knoxville, TN (US)

(73) Assignee: ICX Radiation, Inc., Oak Ridge, TN (US)

( * ) Notice: Subject to any disclaimer, the term of this patent is extended or adjusted under 35 U.S.C. 154(b) by 194 days.

(21) Appl. No.: 12/850,851

(22) Filed: Aug. 5, 2010

(65) Prior Publication Data

US 2012/0114100 A1 May 10, 2012

Related U.S. Application Data

(60) Provisional application No. 61/326,057, filed on Apr. 20, 2010.

(51) Int. Cl.
*H01L 27/146* (2006.01)

(52) U.S. Cl. .................................................. 250/370.09
(58) Field of Classification Search ............ 250/370.01–370.15, 362, 363.01–363.09, 366, 367; 378/62
See application file for complete search history.

(56) References Cited

U.S. PATENT DOCUMENTS

| 4,172,226 A * | 10/1979 | Rubin ........................... 250/394 |
| 2009/0309032 A1 | 12/2009 | Ramsden et al. |
| 2010/0177869 A1 * | 7/2010 | Laurent et al. .................. 378/62 |

* cited by examiner

*Primary Examiner* — Kiho Kim
(74) *Attorney, Agent, or Firm* — Stein McEwen, LLP

(57) ABSTRACT

A directional gamma radiation detector system for determining an angle under which a measured gamma radiation hits a gamma radiation detector system, includes gamma radiation detectors arranged in close distance; detector electronics for operating the at least two gamma radiation detectors as spectrometers in a way that the detector electronics are collecting energy spectra of the detected gamma rays for each gamma radiation detector; and system electronics allowing the directional gamma radiation detector system to identify coincident events in the at least two gamma radiation detectors.

10 Claims, 5 Drawing Sheets

DIRECTIONAL GAMMA RADIATION DETECTOR SYSTEM

CROSS-REFERENCE TO RELATED APPLICATION

This application claims the benefit of U.S. Provisional Patent Application No. 61/326,057, filed Apr. 20, 2010 in the United States Patent and Trademark Office, the disclosure of which is incorporated herein by reference.

BACKGROUND

1. Field

Aspects of the invention relate to a directional gamma radiation detector system for determining the angle under which the measured gamma radiation did hit the directional gamma radiation detector system for homeland security applications.

2. Description of the Related Art

Compact instruments providing gamma spectroscopy and radionuclide identification are known in the art. Nevertheless, those compact instruments are insensitive to the angle where the radiation is coming from. Directionality can be obtained with multi-detector arrangements or position sensitive detectors, for example with so called Compton cameras. Those are complex systems, which require complex algorithms, i.e. recursive reconstruction algorithms, and considerable computing power. Apart from the fact, that those detector systems are complex and large, the needed computer power bars those systems from any real-time applications. Instead, it is necessary to evaluate the data offline (that is, once the measurement has been completed).

Especially in homeland security applications, there is a strong need for a compact detector system, being able to provide any directional information. In contrast to imaging, as known from medical applications, directionality means not mapping of an activity distribution (as required in medical applications) but supporting the search for hidden sources by indicating the direction to the source. The minimum is a "left/right" and/or "up/down" indication, but limited angular resolution would be even better. The latter would allow displaying a pointer which points to the source and thus guides the operator to the source.

Such a directional gamma-ray radiation detector is known from US2009/0309032A1 (Ramsden). This detector system is using a multitude of, preferably four, scintillation detectors, mounted around a pointing axis, evaluating the count rates in each of the scintillators. When the gamma radiation hits the detector system under an angle, those scintillators being closer to the radiation source do shield the other scintillators at least in part, leading to a higher count rate in those scintillators.

Such a system has some severe disadvantages. First, it is necessary to use large and highly efficient scintillator materials when high energy gamma sources are to be detected, as the necessary shielding effect is decreasing with increasing energy. This makes the system large and heavy, which is a specific disadvantage when talking about portable—handheld—devices. Second, the angular resolution is very poor when the angle, under which the gamma radiation hits the detector system, is small with respect to the pointing axis.

SUMMARY

Aspects of the invention improve the prior art by providing a simple and compact directional gamma radiation detector for homeland security applications, which may be even implemented in pager-type or handheld instruments, in order to provide better means for finding illicit or hidden radioactive sources.

Aspects of the invention provide a detector system according to the independent claims. Preferred embodiments are described with the dependent claims.

Aspects of the invention provide a directional gamma radiation detector system, preferably a portable handheld system, for determining the angle under which the measured gamma radiation hits the gamma radiation detector system for homeland security applications, comprising at least two gamma radiation detectors arranged in close distance, preferably mounted face to face, and detector electronics for operating the gamma radiation detectors as spectrometers in a way that the detector electronics is collecting energy spectra of the detected gamma rays for each gamma radiation detector, and system electronics, allowing to identify coincident events in the at least two gamma radiation detectors, set to conduct at least the steps of collecting an energy spectrum $E_{20}$ of the detected gamma rays in a first gamma radiation detector by the corresponding detector electronics, limited to coincident events in a second gamma radiation detector, collecting an energy spectrum $E_{30}$ of said detected coincident gamma rays in a second gamma radiation detector by the corresponding detector electronics, determining the mean energy $<E_{20}>$ of the first energy spectrum $E_{20}$, determining the mean energy $<E_{30}>$ of the second energy spectrum $E_{30}$, and determining the angle under which the measured gamma radiation hits the gamma radiation detector system by comparing the mean energy $<E_{20}>$ with the mean energy $<E_{30}>$. The angle may be just a left or right (or up or down) information, but may, dependent on the specific embodiment of the invention, a specific angle or range of angles also.

According to an aspect of the invention, the direction to the radiation source, i.e., the incident angle of the detected gammas, is calculated from the mean energy $<E_{20}>$ and the mean energy $<E_{30}>$, using a predetermined function and maybe a predetermined calibration table in addition.

According to an aspect of the invention, the predetermined function may be $$F=(<E_{20}>-<E_N>+(<E_{20}>+<E_N>)$$

According to an aspect of the invention, only those parts of the energy spectra $E_{20}$ and $E_{30}$ are used for determining the mean energies $<E_{20}>$ and $<E_{30}>$, where the sum energy of all single coincident events is above or equal a certain threshold TL. The threshold TL may be 200 keV.

According to an aspect of the invention, only those parts of the energy spectra $E_{20}$ and $E_{30}$ are used for determining the mean energies $<E_{20}>$ and $<E_{30}>$, where the sum energy of all single coincident events is below or equal a certain threshold TH.

According to an aspect of the invention, the threshold TH is preferably set with reference to the energy of the gamma radiation to be measured (in case it is known).

According to an aspect of the invention, when all gamma energies, which may be efficiently detected with the gamma detectors effectively used in the detector system, are below the threshold TH so that the detector system is able to exploit the respective information also. Thresholds TH of 3 MeV and 1.5 MeV have proven to be effective in most cases.

According to an embodiment of the invention, the at least two gamma radiation detectors are of the same type, selected from the group of scintillation detectors, semiconductor detectors and gas-filled ionization chambers or proportional detectors.

According to an aspect of the invention, a method for determining the angle under which measured gamma radiation hits a gamma radiation detector system for homeland security applications includes at least two gamma radiation detectors arranged in close distance, preferably mounted face to face, and detector electronics for operating the gamma radiation detectors as spectrometers. According to that method, the detector electronics is collecting energy spectra of the detected gamma rays for each gamma radiation detector, and, at the same time, identifying coincident events in the at least two gamma radiation detectors. As a first step, an energy spectrum $E_{20}$ of the detected gamma rays in a first gamma radiation detector by the corresponding detector electronics, limited to coincident events in a second gamma radiation detector, is collected. At the same time, an energy spectrum $E_{30}$ of said detected coincident gamma rays in a second gamma radiation detector by the corresponding detector electronics is detected. In a further step, the mean energy $<E_{20}>$ of the first energy spectrum $E_{20}$ and the mean energy $<E_{30}>$ of the second energy spectrum $E_{30}$ is determined. From those mean energy spectra, the angle under which the measured gamma radiation hits the gamma radiation detector system is calculated by comparing the mean energy $<E_{20}>$ with the mean energy $<E_{30}>$, preferably using a predetermined function and maybe using a predetermined calibration table.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
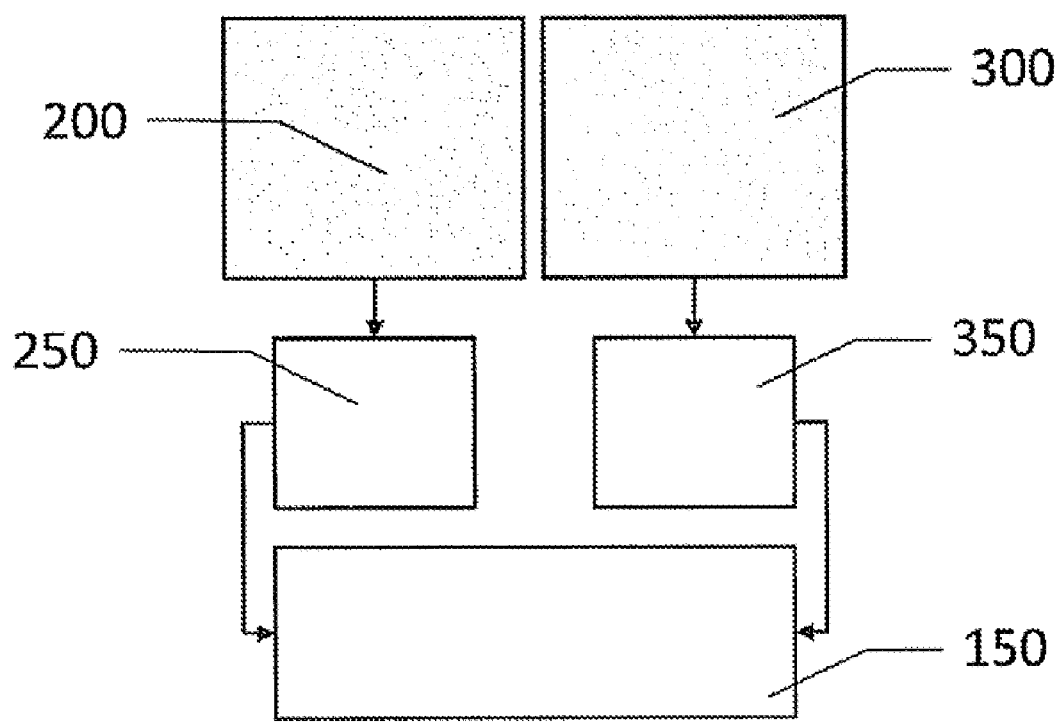
FIG. 1 shows a configuration of the directional gamma radiation detector system having two gamma detectors according to an aspect of the invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 shows the minimum configuration according to an aspect of the invention, comprising two gamma detectors (200, 300), e.g. scintillation detectors or semiconductor detectors, which are arranged in close distance face to face. The detectors are operated as spectrometers, collecting energy spectra of the detected gamma rays. The electronics scheme as incorporated in the respective detector electronics (250, 350) does provide means for measuring coincident spectra in combination with the system electronics (150). It is obvious, that the complete electronics may be integrated into one set of electronics, especially if a compact design is to be achieved.

The most simple case is a symmetric arrangement of two gamma detectors (200, 300) of the same type. Besides the "normal" (single-mode) energy spectrum E derived from energy depositions in either of the detectors, which might be used for purpose of nuclide identification, the spectra $E_{20}$, $E_{30}$, and $E_S$ in coincidence mode are collected. $E_{20}$ (or $E_{30}$) means the energy spectrum (i.e., the measured distribution of deposited energies or the corresponding pulse heights) in the left (200) or right (300) detector if a coincident event is detected in the right (300) or left (200) detector. $E_S$ is the sum energy registered in the left (200) and right (300) detectors in case of a coincidence. These coincidence spectra essentially contain events due to Compton scattering in one of the detectors, followed by another interaction (preferably total absorption) of the scattered gamma in the other detector.

Figure 2A:
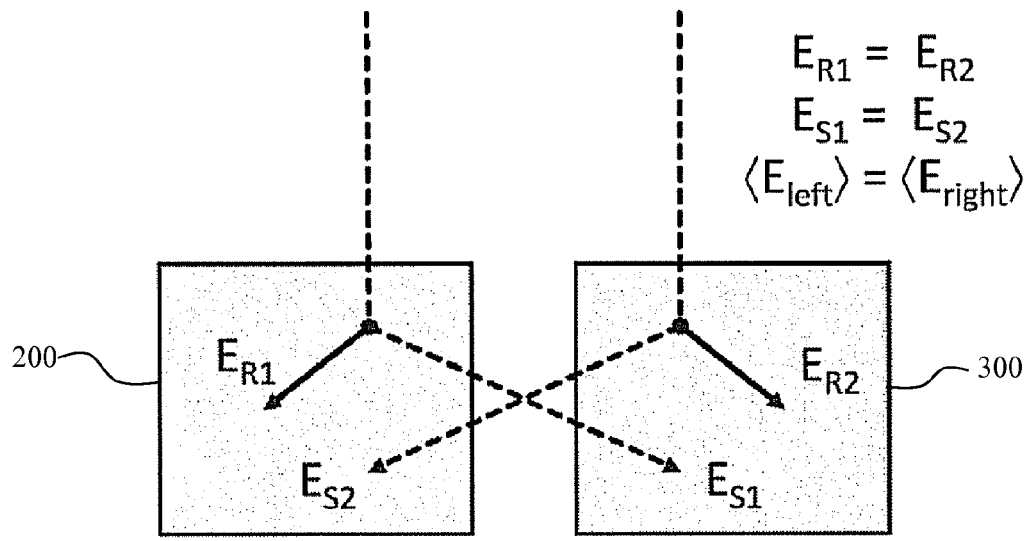
FIG. 2a and FIG. 2b show two different setups having differing in the angular position of the radiation source according to aspects of the invention.
Figure 2B:
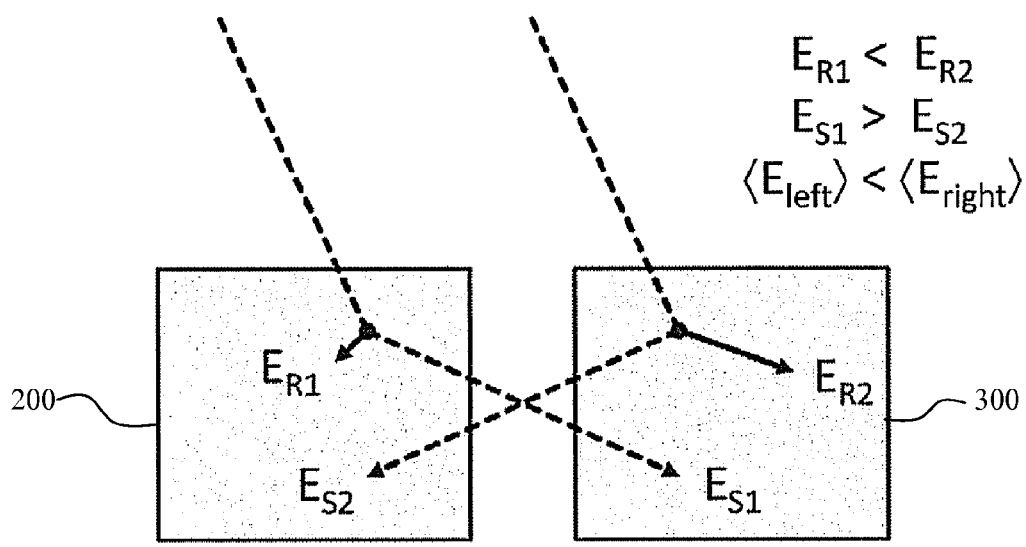
Figure 3A:
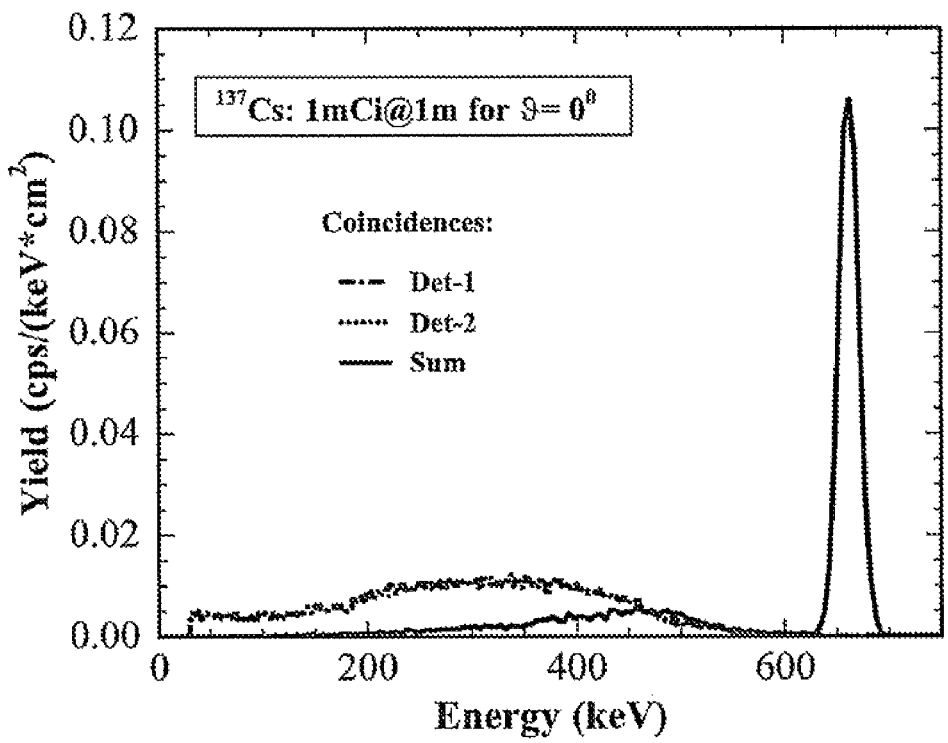
FIGS. 3a to 3d exhibit the evolution of asymmetries in the coincident spectra with the incidence angle (θ) according to aspects of the invention.
Figure 3B:
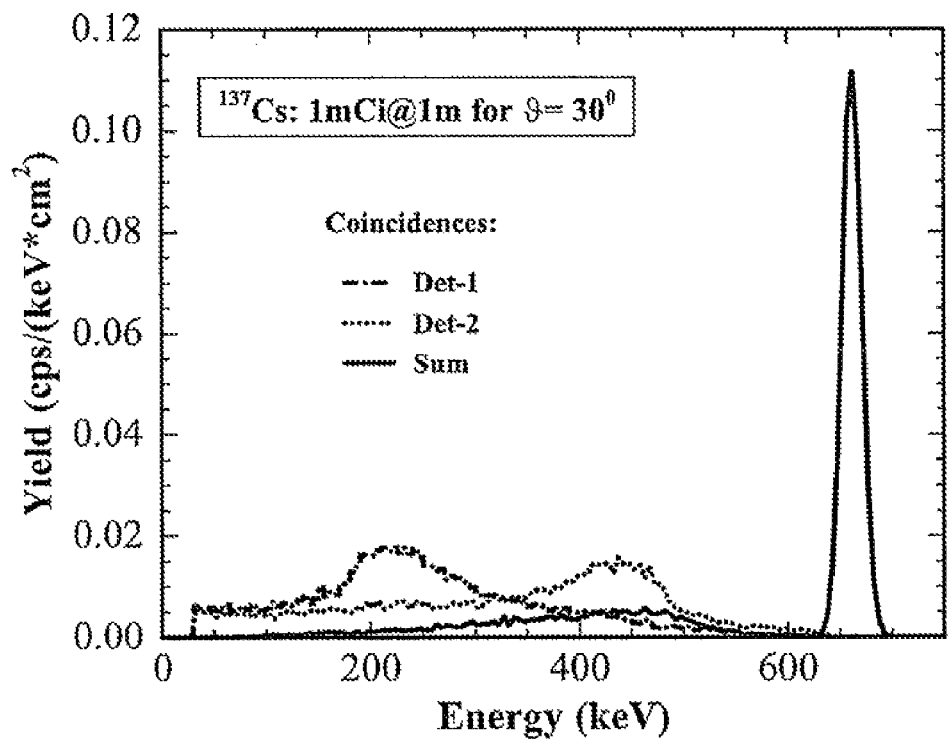
Figure 3C:
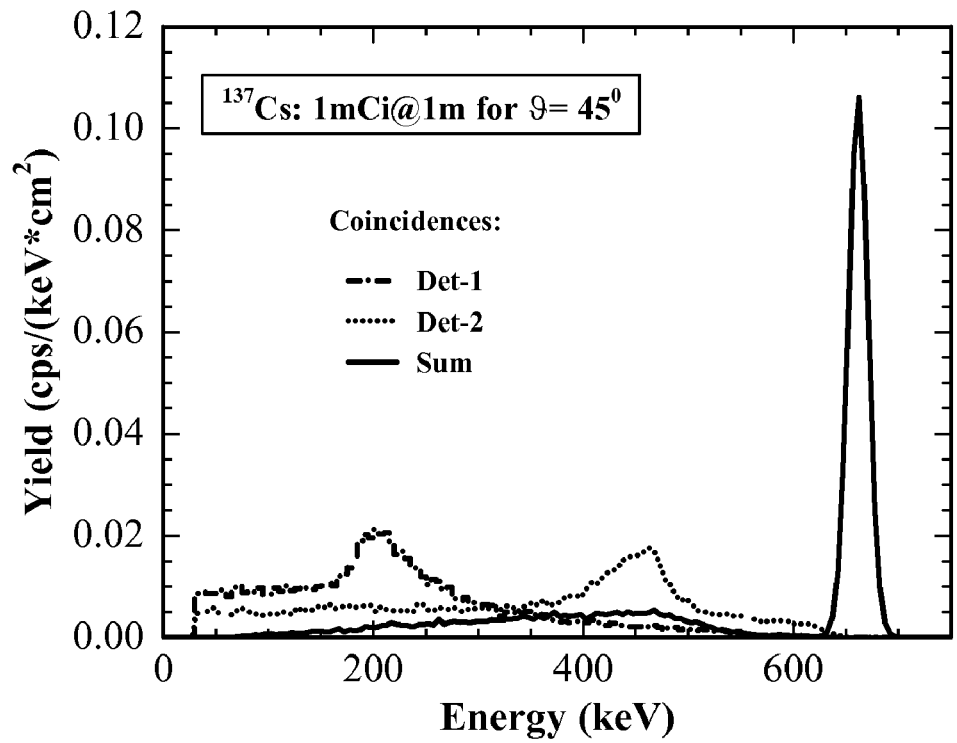
Figure 3D:
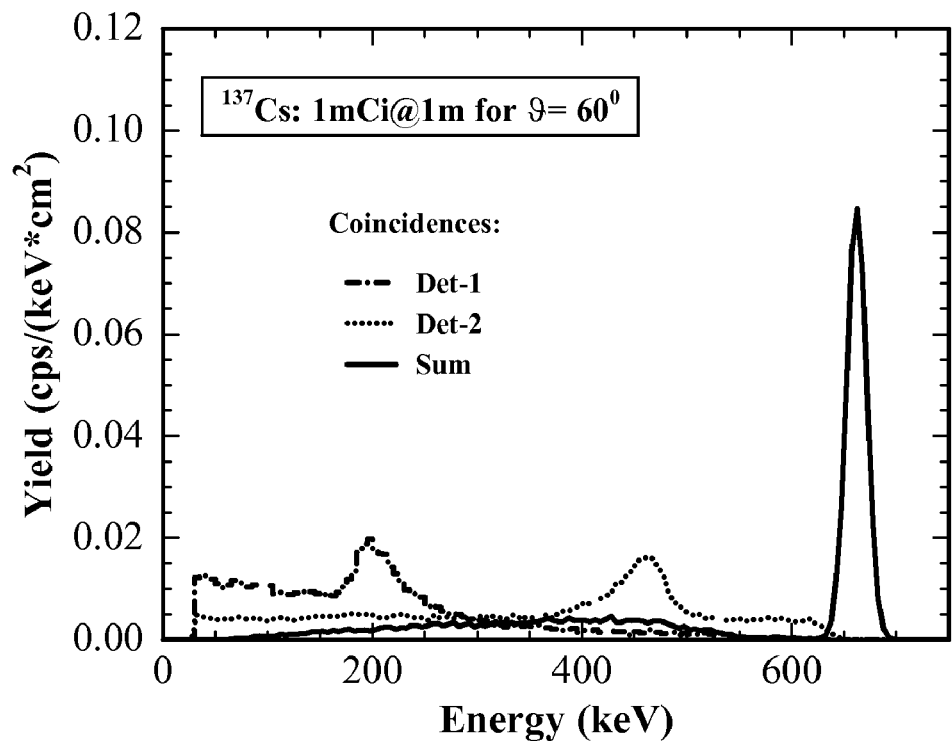

FIG. 2a and FIG. 2b show two different setups, differing in the angular position of the radiation source. In FIGS. 2a and 2b, the dashed lines represent the incident gamma radiation events of a given energy, whereas the dashed arrows represent the corresponding scattered gammas with energies $E_{S1}$ and $E_{S2}$. The bold arrows indicate recoil electrons with energies $E_{R1}$ and $E_{R1}$.

FIG. 2a shows the symmetric case with an angle θ under which the gamma radiation enters the detector system (100) of θ=0°. In FIG. 2b, the gamma radiation is entering the detector system from the left. As a consequence, the mean energy deposition in the left detector (200) is reduced due to the scattering kinematics in case of coincident events in the right detector (300).

When a parallel beam of gammas is hitting the detector system, all gamma quanta are assumed to be parallel to the plane given by the figure. Be θ the angle between the gamma quanta and the symmetry plane between the two detectors. θ=0° then corresponds to a gamma source just in front of the detector system as shown in FIG. 2a. This is the symmetric case.

In the symmetric case both spectra $E_{20}$ and $E_{30}$ cannot differ in shape by reason of symmetry. However, the energy sharing changes with the incidence angle θ as shown in FIG. 2b.

Coincident events in the spectra $E_{20}$, $E_{30}$, and $E_S$ are basically due to Compton scattering in one detector, followed by absorption of the scattered gamma in the other detector.

Coincident events in $E_{20}$ can be caused by scattering of the incident gamma in the left detector (200), followed by absorption of the scattered gamma in the right detector (300). In this case the average scattering angle is smaller than in the symmetric case. Consequently the energy transfer to the scattered electron, which is detected in 200 and therefore reflected in $E_{20}$, is smaller than in the symmetric case. This is a consequence of the Compton scattering formula.

Coincident events due to scattering in the right detector (300) followed by absorption of the scattered gamma in the left detector (200) are, on the other hand, distinguished by a scattering angle which is, on average, larger than in the symmetric case. Consequently the remaining energy of the scattered gamma, eventually deposited in 200 and reflected in $E_{20}$, is then on average smaller than in the symmetric case.

Consequently, the mean energy $<E_{20}>$ of the spectrum $E_{20}$, expressed e.g. in the first momentum (center of gravity) of $E_{20}$, is reduced in favor of the mean energy $<E_{30}>$ of $E_{30}$ if the gamma source is located on the left-hand side. Likewise the mean energy $<E_{20}>$ is increased at the expense of $<E_{30}>$ if the gamma source is located on the right-hand side (not shown).

The inventors for the first time realized, that an incidence angle θ≠0° disturbs the symmetry of the spectra $E_{20}$ and $E_{30}$ in the shown setup sufficiently, so that the asymmetry (measured e.g. in terms of a mean energy) is a measure of θ, being sufficiently accurate for homeland security applications. More specifically, the inventors found that the effect described can indeed be exploited for obtaining directionality with only two detectors.

FIGS. 3a to 3d exhibit the evolution of asymmetries in the coincident spectra with the incidence angle (θ). Note that Det-1 always means the detector at the source side (left detector (200) of FIG. 2), Det-2 the opposite—right—detector (300). The figures show real simulations of coincidence spectra as a function of the incidence angle (θ). The simulations were performed for two 25 mm×25 mm×15 mm $LaBr_3$ detectors, arranged face to face, and exposed to a $^{137}Cs$ source.

Figure 4:
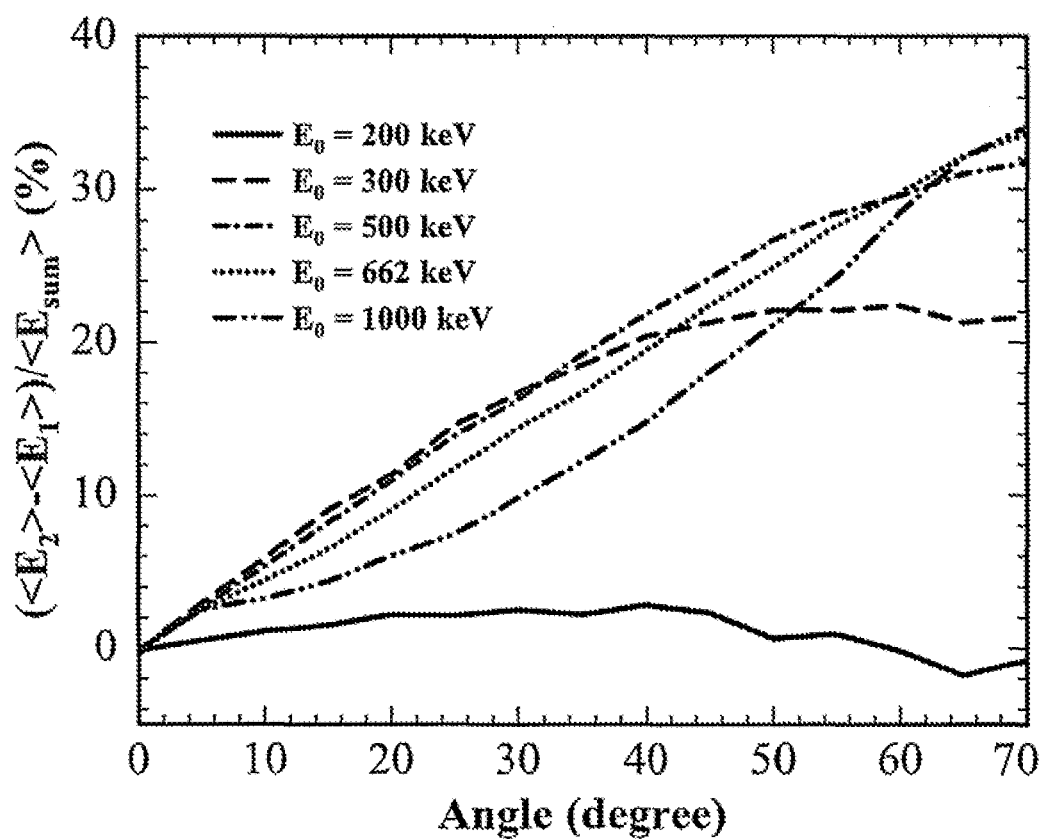
FIG. 4 demonstrates a simple parameter quantifying the left-right spectrum asymmetry in terms of a normalized difference of mean energies according to aspects of the invention.

FIG. 4 demonstrates that even a simple parameter quantifying the left-right spectrum asymmetry in terms of a normalized difference of mean energies as shown in equation 1

$$F=(<E_{20}>-<E_N>)\div(<E_{20}>+<E_N>) \quad \text{Equation 1}$$

which can be easily calculated with a minimum of computing power, is sufficient for measuring the incidence angle θ of ~300...1000 keV gammas with an accuracy of ~20-40°. The ordinate represents the difference of mean energies of the single detectors, normalized to the mean sum energy, all derived from the coincidence spectra. The inventors found that the shape of the dependence is almost consistent for a wide range of gamma energies.

The accuracy of the system may be improved, when only those events are used for the directionality determination, where there is a significant dependency between the angle and the function used. In the case shown in FIG. 4, it is an advantage to use only events with a sum energy $E_S$ above or equal a lower threshold $T_L$=300 keV and/or lower or equal an upper threshold of $T_H$=1 MeV From the above description it becomes clear, that aspects of the invention provide a whole set of substantive advantages over the prior art. First is simplicity, as the directionality in a plane can be obtained sufficiently accurate with only two detectors. As no complex electronics or advanced computing power is needed, the setup can be realized in a technically simple setup with much less complexity than in the prior art. Only because of this, a real-time evaluation of the measured information is possible. A very important further consequence is the low power consumption of this system, which allows integrating it into a pager-type battery equipped handheld device. Finally, aspects of the invention do not only allow for a "left/right" or "up/down" decision but provides a reasonable angular resolution even in its most simple setup with only two radiation detectors.

All this makes the invention ideal for a compact hand-held detector device as it is often required in homeland security applications according to aspects of the invention.

It is stated in addition, that the inventive detector is scalable to linear or chess-board type multi-detector systems according to aspects of the invention.

In some setups, it may also be an advantage to use different radiation detectors in the system, for example a combination of a scintillation detector with a semiconductor detector according to aspects of the invention. The physics does not change if two detectors of different material and/or size are used. An asymmetric detector configuration results in different spectrum shapes for $E_{20}$ and $E_{30}$ in case of θ=0°, but mean spectrum energies change in the same way. With an adequate calibration considering this asymmetry the source direction can be determined in the same way as described for the symmetric arrangement.

The method in aspects of the invention can be refined if an arrangement of three detectors (left, right and middle) is used. A comparison of the spectra of the left and the right detector obtained in coincidence with the middle detector, and of the spectra of the middle detector in coincidence with the left and the right detector, respectively, then provides directional information in addition to the information derived from the comparison of the adjacent (left/middle and middle/right) detector pairs only. This improves the accuracy for measuring the incidence angle θ.

If configurations of more than three detectors are used, each pair (or triple) of adjacent detectors can be considered as a directional detector as described above. A combination of all directional data further improves the accuracy for measuring the incidence angle θ.

Arrangements of multiple detectors could comprise detectors made of light elemental constituents, which are distinguished by a low effective charge number Z and a reduced probability of full-energy absorption. This enhances the number of escaping, Compton-scattered gammas which provide the directional information.

Note that linear detector configurations provide directionality in a defined detection plane, while chessboard-like configurations of detectors can complement the left-right by an up-down directionality.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A directional gamma radiation detector system for determining an angle under which a measured gamma radiation hits a gamma radiation detector system, comprises:
    at least two gamma radiation detectors arranged in close distance;
    detector electronics for operating the at least two gamma radiation detectors as spectrometers in a way that the detector electronics are collecting energy spectra of the detected gamma rays for each gamma radiation detector; and
    system electronics allowing the directional gamma radiation detector system to identify coincident events in the at least two gamma radiation detectors and set to conduct at least the following steps:
        collecting an energy spectrum $E_{20}$ of the detected gamma rays in a first one of the at least two gamma radiation detectors by the corresponding detector electronics (250), limited to coincident events in a second one of the gamma radiation detectors,
        collecting an energy spectrum $E_{30}$ of the detected coincident gamma rays in the second gamma radiation detector by the corresponding detector electronics (350),
        determining a mean energy $<E_{20}>$ of the first energy spectrum $E_{20}$,
        determining a mean energy $<E_{30}>$ of the second energy spectrum $E_{30}$, and determining the angle under which the measured gamma radiation hits the gamma radiation detector system by comparing the mean energy $<E_{20}>$ with the mean energy $<E_{30}>$.

2. The detector system according to the claim 1, wherein the direction to the radiation source is an incident angle of the detected gammas and is calculated from the mean energy $<E_{20}>$ and the mean energy $<E_{30}>$ using a predetermined function.

3. The detector system according to claim 2, wherein in the predetermined function is $F=(<E_{20}>-<E_{30}>) \div (<E_{20}>+<E_{30}>)$.

4. The detector system according to claim 1, wherein:
only those parts of the energy spectra $E_{20}$ and $E_{30}$ are used for determining the mean energies $<E_{20}>$ and $<E_{30}>$, and
the sum energy of all single coincident events is above or equal a certain threshold TL.

5. The detector system according to claim 4, wherein the threshold TL is 200 keV.

6. The detector system according to claim 1, wherein only those parts of the energy spectra $E_{20}$ and $E_{30}$ are used for determining the mean energies $<E_{20}>$ and $<E_{30}>$, and
the sum energy of all single coincident events is below or equal a certain threshold TH.

7. The detector system according to claim 6, wherein the threshold TH is 3 MeV.

8. The detector system according to claim 1, wherein each of the at least two gamma radiation detectors are of the same type selected from the group of Scintillation detectors,
Semiconductor detectors, and
Gas-filled ionization chambers or proportional detectors.

9. The detector system according to claim 1, wherein the detector system comprises a portable handheld system for homeland security applications.

10. The detector system according to claim 1, wherein the at least two gamma radiation detectors are mounted face to face.

* * * * *